United States Patent Office 3,127,072
Patented Mar. 31, 1964

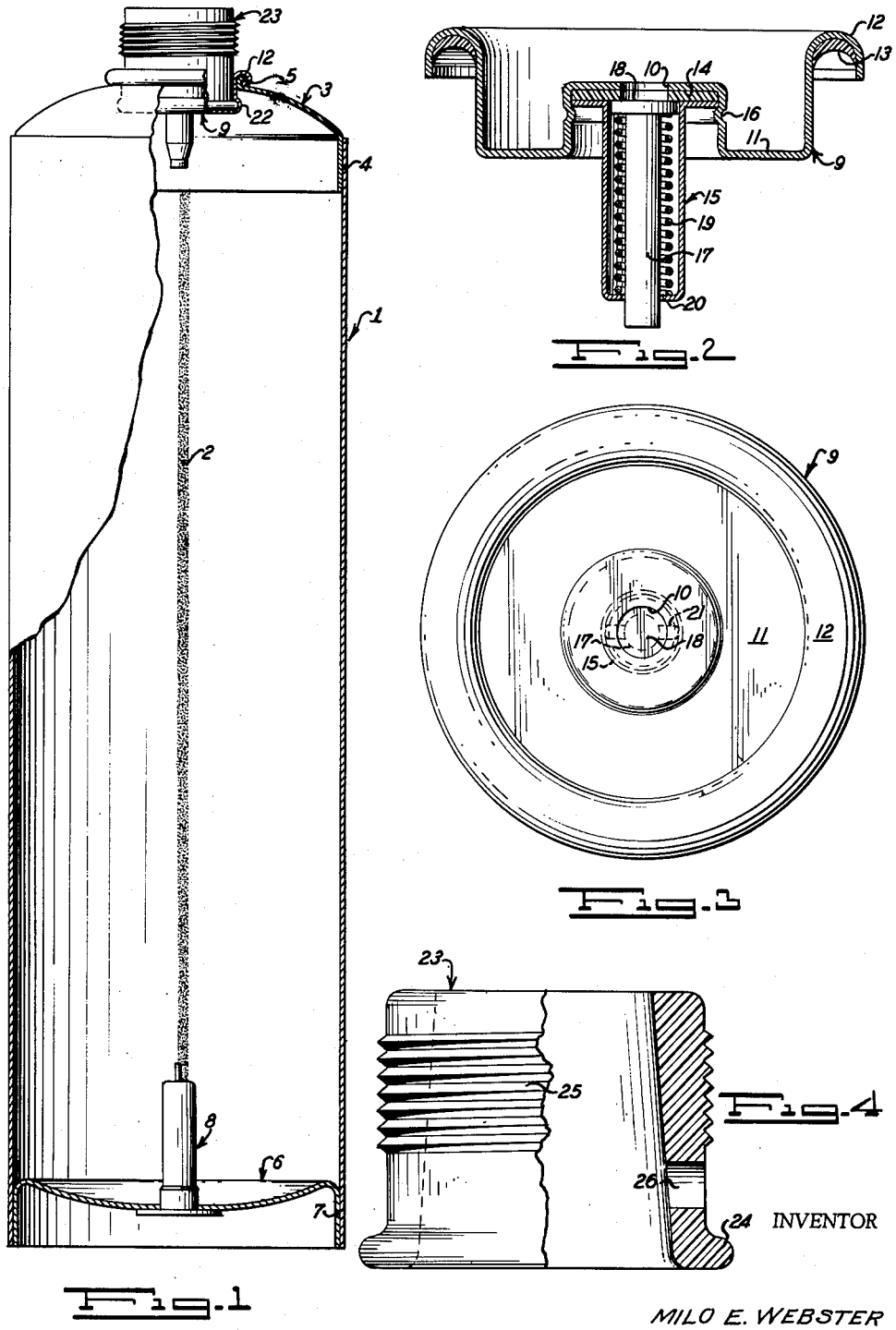

3,127,072
PRESSURE CONTAINER CLOSURE CONSTRUCTION WITH MEANS FOR ATTACHING A TAP CONNECTION THERETO
Milo E. Webster, Rochester, N.Y., assignor to Bernz O Matic Corporation, a corporation of New York
Filed Feb. 28, 1961, Ser. No. 92,342
5 Claims. (Cl. 222—394)

This invention relates to an improved pressure container construction. The invention more particularly relates to an improved closure device or tap connection construction for a pressurized fluid container, such as an LP (liquefied petroleum) gas cylinder, as for example of the small portable, throw-away type.

In recent years a number of portable appliances which operate off LP gas, and particularly propane, have been widely marketed to the home consumer and various trades. These appliances include, for example, blow torches, lanterns, cook-stoves, grilling devices, fire pots, leak detectors and the like. The commercial success of these items has been predicated upon a convenient, readily available and inexpensive source of LP gas.

Due to its highly inflammable nature the sale and transportation of LP gas is strictly regulated. In the past only relatively large, permanent, refillable cylinders were available for this type of fuel. These cylinders were generally too bulky to be considered truly portable, and their expense and inconvenience in having the same refilled at an authorized station for the most part, precluded their purchase and use by the ordinary amateur handyman and the general public.

Not until the development of the small portable, throw-away cylinder, did the use of portable, propane-operated tools and other appliances, become widespread among the average purchasers. The portable, throw-away LP gas cylinder could be purchased in any ordinary hardware store, could be used interchangeably with various LP appliances, and when the supply of LP gas was exhausted, could be thrown away, avoiding the inconvenience and natural purchaser-resistance to items that had to be returned and/or refilled.

In connection with these cylinders, as with any other throw-away item, cost is of course of prime consideration. This is particularly true with the LP cylinders since regulations require that the same be sturdily constructed of relatively heavy gauge steel and must meet high safety requirements. In spite of these difficulties modern drawing techniques with the use of automatic punch presses and mass production made successful marketing of these throw-away LP cylinders possible.

The cylinders must have a closure device arrangement which allows the attachment of a tap connection so that the appliance, in connection with which the cylinder is being used, may be attached to withdraw or tap the LP gas. The closure device is generally in the form of a bushing turned from relatively heavy metal stock, as for example on an automatic screw machine, and is provided with a valve arrangement which would automatically seal the cylinder and automatically open upon attaching the tap connection of the appliance in a gas-tight manner. Thus, for example, the bushing is provided with a central passage having an O-ring and sealed with an ordinary automobile tire valve, as for example described in U.S. Patent 2,793,504. When the tap connection of the appliance was screwed over the bushing it had a hollow, elongated stem which extended into the tubular passage in sealing engagement with the O-ring, and was so dimensioned that when the tap connection was secured in place, the stem would press against the tire valve, forcing the same open and allowing the contents of the container to be tapped through the tubular hollow stem, to operate the appliance. The closure devices of this type were relatively expensive to fabricate, had to be brazed in place on the cylinder, and greatly increased the cost.

The industry therefore constantly strove to develop a closure device construction which would be satisfactory and safe, meet the required regulations in connection therewith, and which yet could be produced more economically and easily than the conventional bushings.

One object of this invention is a cylinder having a closure device construction which meets the above requirements.

A further object of this invention is a closure device including a valve structure for a pressurized fluid cylinder, such as an LP cylinder, which is safe, reliable and yet which may be produced economically.

These and still further objects will become apparent from the following description read in conjunction with the drawings in which:

FIG. 1 is a vertical section of an embodiment of an LP gas cylinder incorporating the closure device in accordance with the invention;

FIG. 2 is a cross-section of a portion of the closure device of FIG. 1;

FIG. 3 is a plan view of FIG. 2; and

FIG. 4 is a cross-section of the bushing of the closure device of FIG. 1.

As shown in FIG. 1 of the drawing, 1 represents a cylindrical metal tube which has been formed from a rectangular metal sheet, for example a rectangular sheet of steel about .023″ thick, such as by rolling and welding together the overlapping edges to form the welded seam 2. This welded seam may, for example, be formed with a small overlap of the edges and with a mesh weld. The top of the tube 1 is sealed by the end closure cap 3, which may be stamped from sheet metal and has an outer diameter which corresponds to the inner diameter of the tube 1, so that the same may be positioned in the tube, as shown, and welded for example with a lap seam weld at 4. The end of the closure cap 3 is provided with a rolled edge or lip 5, defining a central opening. The bottom of the tube 1 is sealed with an end closure 6 having an outer diameter corresponding to the inner diameter of the cylindrical tube 1. The bottom closure is welded in place with a lap seam at 7. This end closure may be punched from sheet metal having a comparable or slightly thicker cross-section than that of the tube 1. In the center of the end closure 6 an excess pressure relief valve 8 of conventional construction is provided. The construction of the cylinder as described to this point is substantially as described in copending application, Serial No. 816,485, filed May 18, 1959, now Patent No. 3,029,981, dated April 17, 1962. In place of this cylinder construction, any other known or conventional LP cylinder construction may be used provided that the same has the central hole or bung defined by a rolled edge or bead corresponding to the bead or edge 5. A cap 9 of sheet metal is crimped in sealing engagement with the bead 5, thus sealing the central opening or bung in the cylinder. The cap 9 has the construction as shown in FIG. 2 and is provided with a central opening 10, a dished-out body portion 11, and a curled-over edge 12. The inner surface of the curled edge 12 is provided with a coating of elastic sealing material, such as rubber or the like, at 13. A washer-shaped gasket of rubber, neoprene or the like, 14, is fitted on the underside of the surface forming the hole 10. This gasket is secured in place by the stem member 15, of light sheet metal or the like, which is sealed in place by the crimping at 16. Positioned in the stem member is the valve member 17 having a valve stem and a flat, disc-shaped valve face 18. A spring 19 resiliently urges the valve face in sealing engagement with the gasket 14. The spring 19 is secured in place by the turned-over lip portion 20 of the stem 15. Ample gas clearance is provided between the valve stem and the turned-over portion 20, for example by the provision of slots as diagrammatically shown by the dotted lines at 21 in FIG. 3. Prior to joining cap member 9 to the tube 1, the cap 9 is crimped in place, using a conventional crimping device and pressing the same from opposite sides, so that the same bulges and deforms at 22 (FIG. 1), and the lip 12 is curled around the bead 5, with the resilient gasket material 13 making a firm, gas-tight seal with this bead. As can well be appreciated, the securing of the closure cap 9 in place may be very simply and effectively achieved on a production line basis, using high speed machinery, and there is a substantial cost saving as compared with the brazing or welding of the prior closures in place.

A cylindrical bushing 23, as for example of a fairly rigid and strong plastic material, such as polypropylene, high density polyethylene, nylon or the like, is then pressed in place in the body of the closure cap 9. The bushing has the construction as shown in FIG. 4 and is provided with the base flange 24, the external male threads 25, and an opening 26 through its side wall. The base flange 24, due to the inherent elasticity of the material of the bushing, snaps in place into the bulged-out portion 22 formed by the crimping, and thus for ordinary purposes will be firmly secured in place, but upon being subjected to extraordinary stresses, may pop out without injuring the remainder of the closure device. After the assembly of the cylinder, the welding of the parts and the filling in the conventional manner, for example with propane, the device is used in the same manner as the conventional throw-away cylinders. Thus, the valve 17 sealing against the gasket 14, will prevent any leaking of the contents of the container, and the seal of the valve is aided by the pressure within the container. Excess pressure, as for example caused by undue heating, fire, etc. is released by means of the excess pressure safety valve 8, in the conventional manner.

The conventional tap connection of the gas appliance, as for example described in U.S. Patent 2,793,504, may be screwed in place over the bushing 23. The central, elongated hollow stem of the tap connection fits within the hole 10, in sealing engagement with the gasket 14, and as the tap connection is screwed down, depresses the valve 17, pressing the spring 19 and allowing the gas to flow from the interior of the container through the stem 15, past the valve seat 18, into the hollow stem of the tap connection and into the gas appliance, such as a torch, in the conventional manner. When the tap connection is removed by unscrewing, the valve automatically closes, so that the contents of the container are not lost and the container may be stored and reused, with the same or a different gas appliance.

If the bushing 23 is subjected to undue stress, as for example by being dropped or knocked, with or without the tap connection connected, due to its resilient structure and press-fit, it can snap loose without injuring the remainder of the closure and thus without causing dangerous leaking of the container. The bushing 23 is thus fitted in place so that the same will break loose before there is any damage to the closure cap 9, which could affect its seal. Thus, for example, if a torch is screwed in place on the device and dropped so as to put undue stress on the device, the bushing will snap loose, remaining attached to the tap connection and torch head, the stem of the tap connection will pull free from the hole 10 in gasket 14, so that the container will automatically seal, the flame will extinguish and no damage, fire hazard or loss of contents will be caused.

The hole 26 allows release of pressure from the interior of the bushing and thus prevents the same from being popped off by gas pressure if, for example, upon attaching the tap connection some gas leaks past the gasket 14.

While the invention is particularly adaptable to small LP cylinders of the throw-away type, the same of course is also applicable to pressure containers in general, regardless of their intended use or contents.

While the invention has been described in detail with reference to specific embodiments shown, various changes and modification which fall within the spirit of the invention and scope of the appended claims will become apparent to the skilled artisan.

I claim:

1. In a container for pressurized fluids having a discharge opening, the improvement which comprises a cap having a peripheral annular recess portion in sealing engagement with the portion of the container surrounding said opening, a discharge passage defined in said cap, a closure valve sealing said discharge passage, and a sleeve bushing of resilient deformable plastic material having threads for attachment of a tap connection thereto and extending externally of said container, said bushing being connected to said cap at its base coaxially with said discharge passage by being pressed into said recess, the connection between said bushing and said cap being of lesser strength than the connection of said cap to the container whereby the bushing will break away from said cap when subjected to stress without detaching said cap said bushing defining a lateral gas release passage therethrough.

2. Improvement according to claim 1 in which said bushing is a polypropylene bushing.

3. Improvement according to claim 1 in which said bushing has a base flange pressed in place in said recess.

4. In a container for pressurized fluids, such as LP gas, having a discharge opening, the improvement comprising said discharge opening being defined by a beaded edge, a cap defining a central discharge passage, an annular recessed portion and an outer annular wall portion sealing said opening with said outer annular wall portion pressed around said beaded edge, a valve normally closed and adapted to be resiliently pressed open by the stem of a tap connection, sealing said discharge opening, and a sleeve bushing threaded for the attachment of a tap connection thereto extending externally of said container connected at its base to said cap coaxially with said discharge passage, said sleeve bushing being of resilient deformable plastic material press fitted into said recess forming a connection between said bushing and cap of lesser strength than the connection between said cap and container whereby said bushing will break away from said cap when subjected to stress without detaching said cap, said sleeve bushing defining a lateral gas release passage therethrough.

5. Improvement according to claim 4 in which said sleeve bushing is formed of polypropylene.

References Cited in the file of this patent

UNITED STATES PATENTS

| 1,534,136 | Ostrander | Apr. 21, 1925 |
|---|---|---|
| 2,080,485 | Johnsen | May 18, 1937 |
| 2,301,724 | Vischer | Nov. 10, 1942 |
| 2,317,545 | Madsen et al. | Apr. 27, 1943 |
| 2,599,935 | Pasker | June 10, 1952 |
| 2,723,055 | Beard | Nov. 8, 1955 |
| 2,750,081 | Campbell | June 12, 1956 |
| 2,766,915 | Campbell | Oct. 16, 1956 |
| 2,804,988 | Dobbins | Sept. 3, 1957 |
| 2,860,820 | Falligant | Nov. 18, 1958 |
| 2,925,103 | Kerr et al. | Feb. 16, 1960 |
| 2,961,128 | Cochran | Nov. 22, 1960 |
| 2,989,091 | Lowenthal | June 20, 1961 |
| 2,991,044 | Briechle | July 4, 1961 |
| 3,006,510 | Sagarin | Oct. 31, 1961 |

FOREIGN PATENTS

| 1,227,311 | France | Aug. 19, 1959 |